(12) United States Patent
Moske et al.

(10) Patent No.: US 7,921,982 B2
(45) Date of Patent: Apr. 12, 2011

(54) METHODS AND APPARATUS FOR HANDLING PRODUCTS

(75) Inventors: Anthony Rodney Moske, Parkers Prairie, MN (US); Ronald Matthew Gust, Miltona, MN (US)

(73) Assignee: Douglas Machine, Inc., Alexandria, MN (US)

( * ) Notice: Subject to any disclaimer, the term of this patent is extended or adjusted under 35 U.S.C. 154(b) by 793 days.

(21) Appl. No.: 11/782,104

(22) Filed: Jul. 24, 2007

(65) Prior Publication Data

US 2009/0025344 A1    Jan. 29, 2009

(51) Int. Cl.
*B65B 13/20* (2006.01)

(52) U.S. Cl. ............. 198/418.9; 198/406; 198/409; 198/431; 198/434; 198/460.3; 198/586; 198/607

(58) Field of Classification Search .......... 198/406, 198/409, 418.9, 431, 434, 460.3, 586, 607
See application file for complete search history.

(56) References Cited

U.S. PATENT DOCUMENTS

| | | | |
|---|---|---|---|
| 1,581,583 A | 4/1926 | Low | |
| 2,979,182 A | 4/1961 | Haab | |
| 3,593,860 A | 7/1971 | Brenner | 214/6 |
| 3,796,293 A | 3/1974 | Warmann | 193/35 |
| 4,421,222 A * | 12/1983 | Stuermer | 198/382 |
| 4,431,104 A * | 2/1984 | Orlowski et al. | 198/427 |
| 4,492,070 A | 1/1985 | Morse et al. | 53/438 |
| 4,531,343 A | 7/1985 | Wood | 53/399 |
| 4,889,224 A | 12/1989 | Denker | |
| 4,984,677 A | 1/1991 | Prakken | 198/418.6 |
| 5,669,754 A * | 9/1997 | Croteau et al. | 414/801 |
| 6,398,204 B1 * | 6/2002 | Keane et al. | 271/2 |
| 6,430,895 B1 | 8/2002 | Kitagawa et al. | |
| 6,622,848 B1 | 9/2003 | Lattimer et al. | 198/418.9 |
| 7,021,450 B2 * | 4/2006 | Jones, Jr. | 198/462.1 |
| 7,111,722 B2 | 9/2006 | Burch | |
| 2004/0069156 A1 | 4/2004 | Reed et al. | 99/450.1 |
| 2004/0084282 A1 * | 5/2004 | Hellmann et al. | 198/540 |
| 2005/0247032 A1 | 11/2005 | Lucido et al. | |
| 2006/0131131 A1 * | 6/2006 | Mayer | 198/436 |

FOREIGN PATENT DOCUMENTS

| | | |
|---|---|---|
| DE | 2546594 A1 | 4/1977 |
| DE | 4117746 C1 | 6/1992 |
| EP | 0302543 A1 | 2/1989 |
| EP | 0605740 A1 | 7/1994 |
| FR | 2519951 A | 7/1983 |
| FR | 2621885 A | 4/1989 |
| GB | 1491273 | 11/1977 |

* cited by examiner

*Primary Examiner* — Mark A Deuble
(74) *Attorney, Agent, or Firm* — Alan Kamrath; Kamrath & Associates PA

(57) ABSTRACT

Apparatus (10) loads product in the form of bags into a carton held at a tilt angle. The leading ends of the bags on an adjustment conveyor (20) are abutted by a bumper (30) to reorient the bags 90° on the adjustment conveyor (20). The downstream roller (44) of a twist conveyor (40) is tilted to collate bags on a decline conveyor (70). The collated bags are moved on an orientation conveyor (74) to engage a product scoop (110) extending at an inclined position and moved to a vertical position to vertically orient the bags. The orientation conveyor (74) is moved to an offset position to allow the bags to drop onto a lowerator (92) of an accumulator (86) where they can be sandwiched between retainer plates (88, 90). A pusher plate (94) pushes the bags off the lowerator (92) into the carton and is tilted to correspond to the tilt angle of the carton.

9 Claims, 8 Drawing Sheets

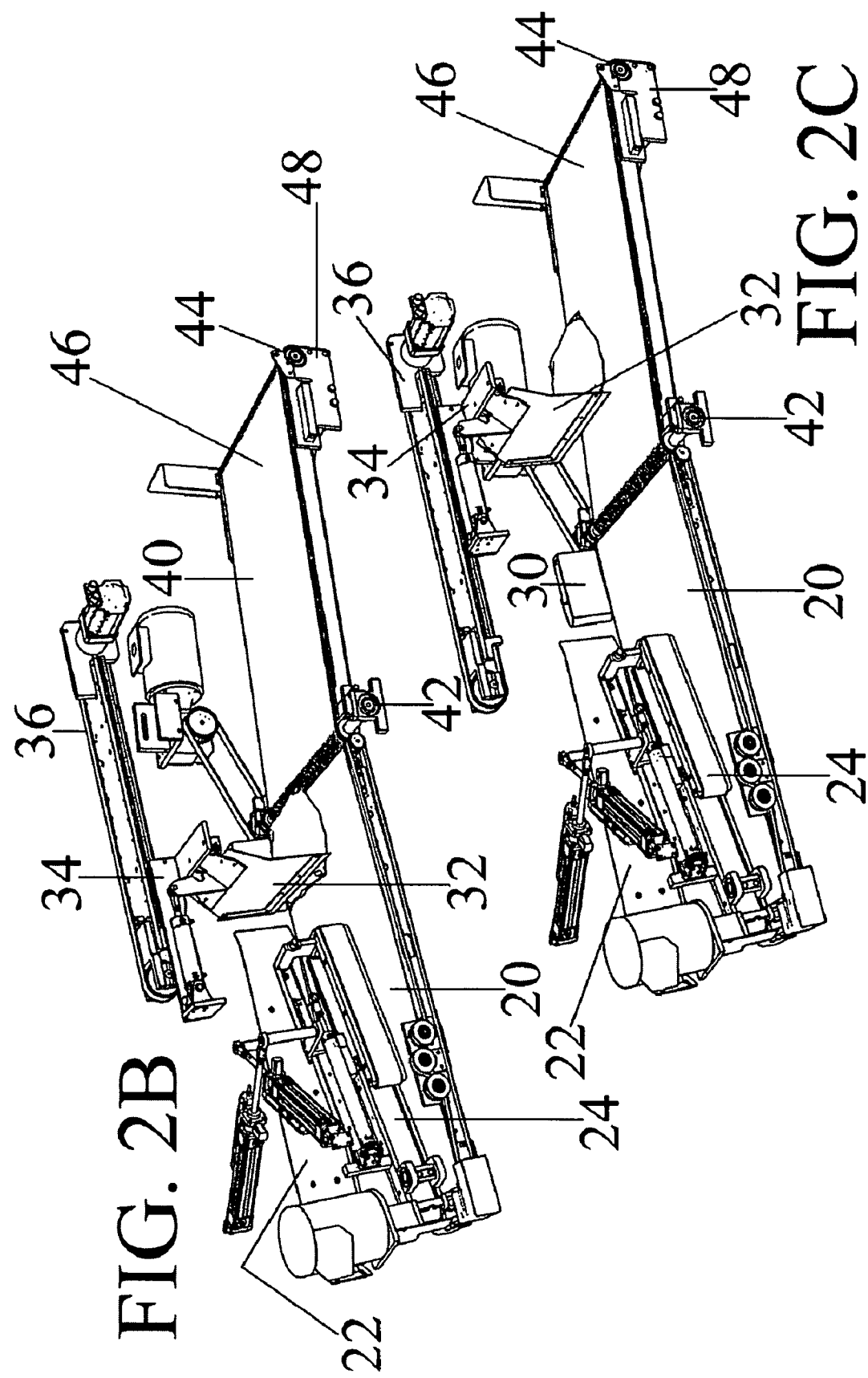

METHODS AND APPARATUS FOR HANDLING PRODUCTS

BACKGROUND

The present invention generally relates to apparatus and methods for filling cartons and specifically to devices and methods for receiving, orientating, shifting, collating and handling products synergistically combined to fill products into cartons.

Many products are retailed in bags which contain product such as foods including potato chips, tortilla chips, cookies, and other snack items, which bags must be placed in cartons for storage and transportation. Thus, there is a need in the field of packaging products for methods for quickly and efficiently filling cartons with bags which are cost effective, which do not damage the product, and which are relatively trouble free.

SUMMARY OF THE INVENTION

The present invention solves this need and other problems in the field of packaging products by providing, in the preferred form, novel methods and devices for handling products and which may be synergistically related for filling products into cartons.

In an aspect of the present invention, methods and device are provided for changing the orientation of a product 90° being conveyed on a conveyor by abutting the leading end of the product at an extent less than one half of the width of the product. In preferred forms, the product is abutted by a bumper which in most preferred forms is pivotal between an abutting position and a noninterfering position. In further preferred forms, the product is pushed by a pusher moving in the conveying direction after the product is oriented 90° and is moved to be parallel and closely adjacent to a product guide before abutting with the bumper.

In a further aspect of the present invention, product is collated by conveying a second product on a first conveyor in a first conveying direction onto a product moved by a second conveyor in a second conveying direction perpendicular to the first conveying direction and for a distance less than the length of the product. In preferred forms, the angle of the downstream roller of the first conveyor is adjusted in a plane parallel to the second conveying direction to minimize the drop of the product from the second conveyor. Further, the second conveyor is inclined downwardly so that product has a lower extent when moved in the second conveying direction.

In still further aspects of the present invention, a product scoop is moved between an extended, inclined position to a retracted vertical position as product is moved onto the product scoop to orient collated product vertically. In most preferred forms, the collated product is moved by being conveyed upon an orientation conveyor and by being pushed by a pusher moving at an equal speed to the orientation conveyor.

In other aspects of the present invention, product located on a conveyor is dropped into an accumulator by moving the conveyor from an aligned position above the accumulator to a position offset from the accumulator. Product is supported upon a lowerator in the accumulator which can be lowered to below the conveyor in the offset position and can be compressed against the conveyor in the aligned position in preferred forms. Further, the pusher plate which forms one side of the accumulator can be tilted when moving parallel to the lowerator to correspond to the tilt angle of the carton when pushing product from the accumulator into the carton.

The present invention will become clearer in light of the following detailed description of an illustrative embodiment of this invention described in connection with the drawings.

FIGS. 2A-2C show perspective views of the orientation adjustment device of the apparatus of FIG. 1.

Figure 1:
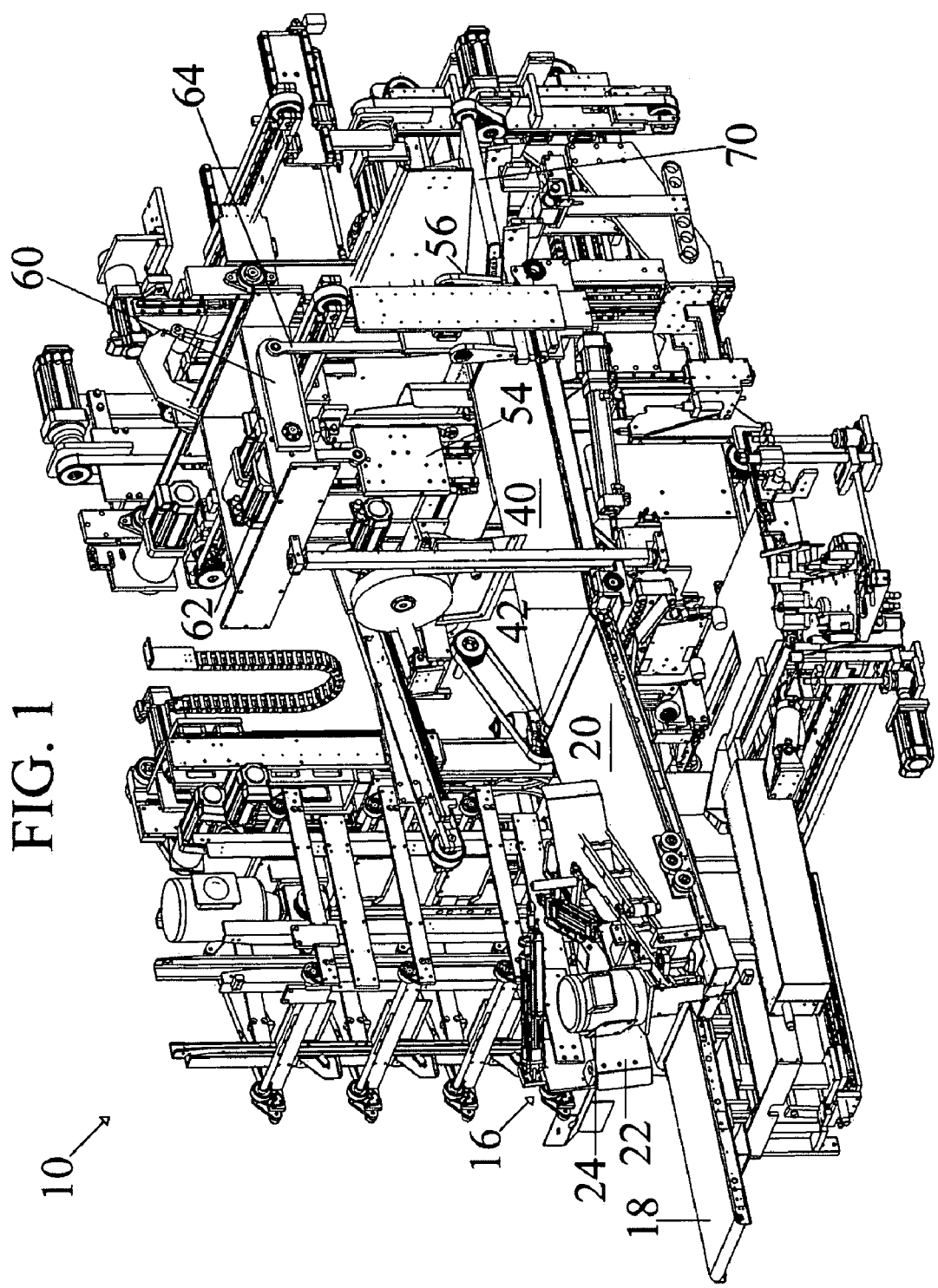
FIG. 1 shows a perspective view of an apparatus for loading bags into a carton utilizing methods according to preferred teachings of the present invention, with portions broken away to view internal components.
Figure 2A:
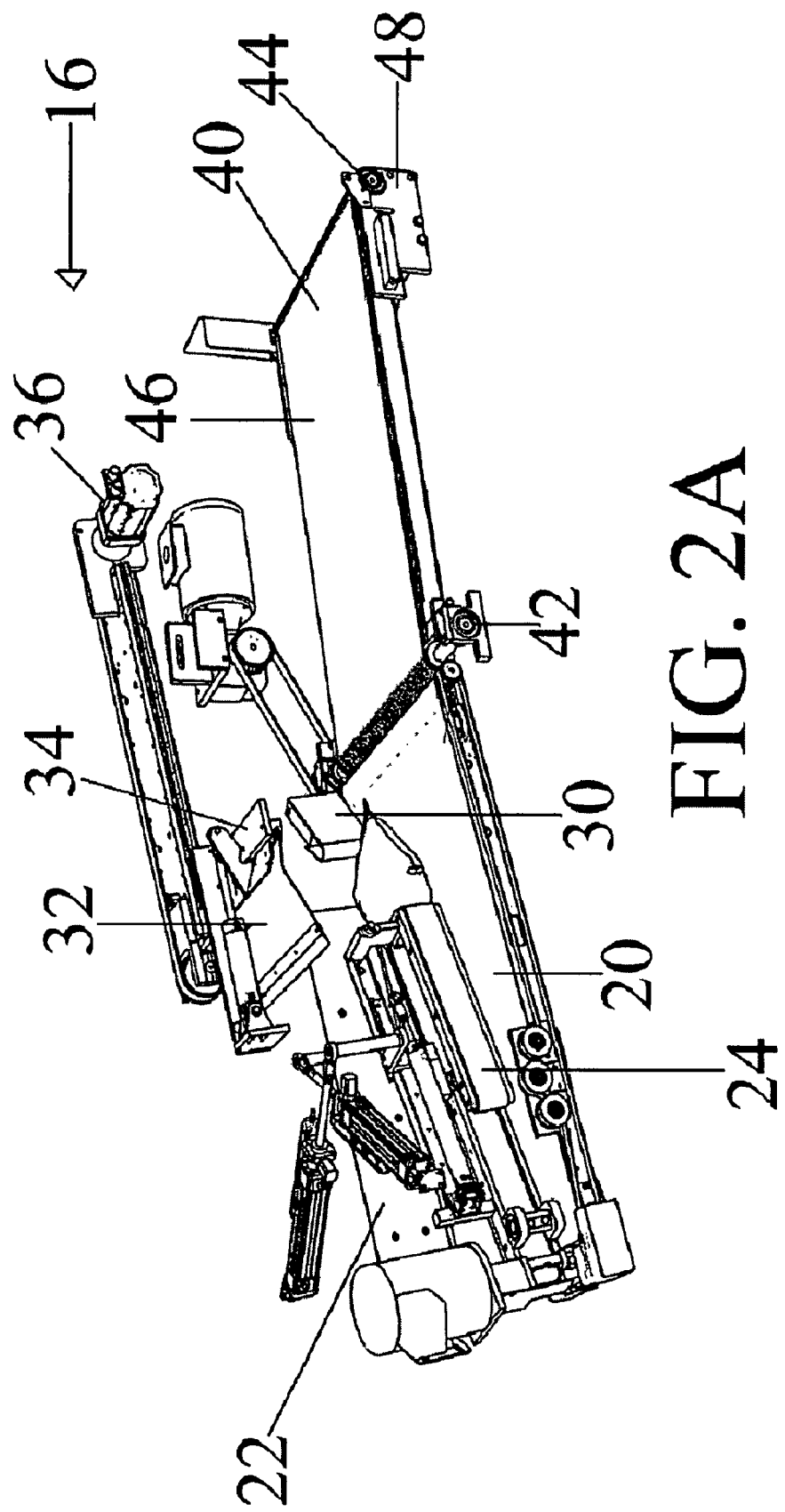
Figures 3A, 3B:
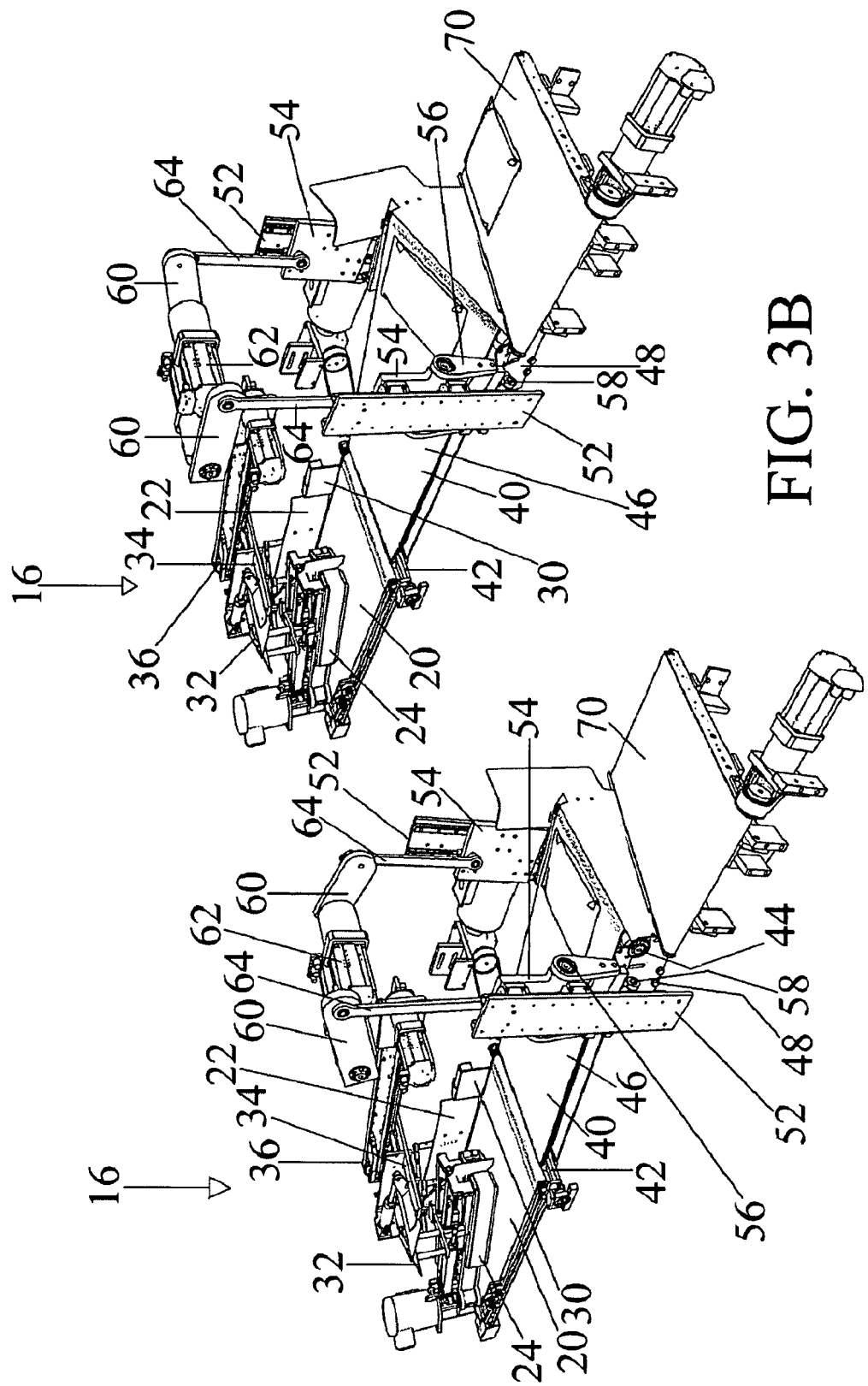
FIGS. 3A and 3B show perspective views of the orientation adjustment and collating devices of the apparatus of FIG. 1.
Figure 4A:
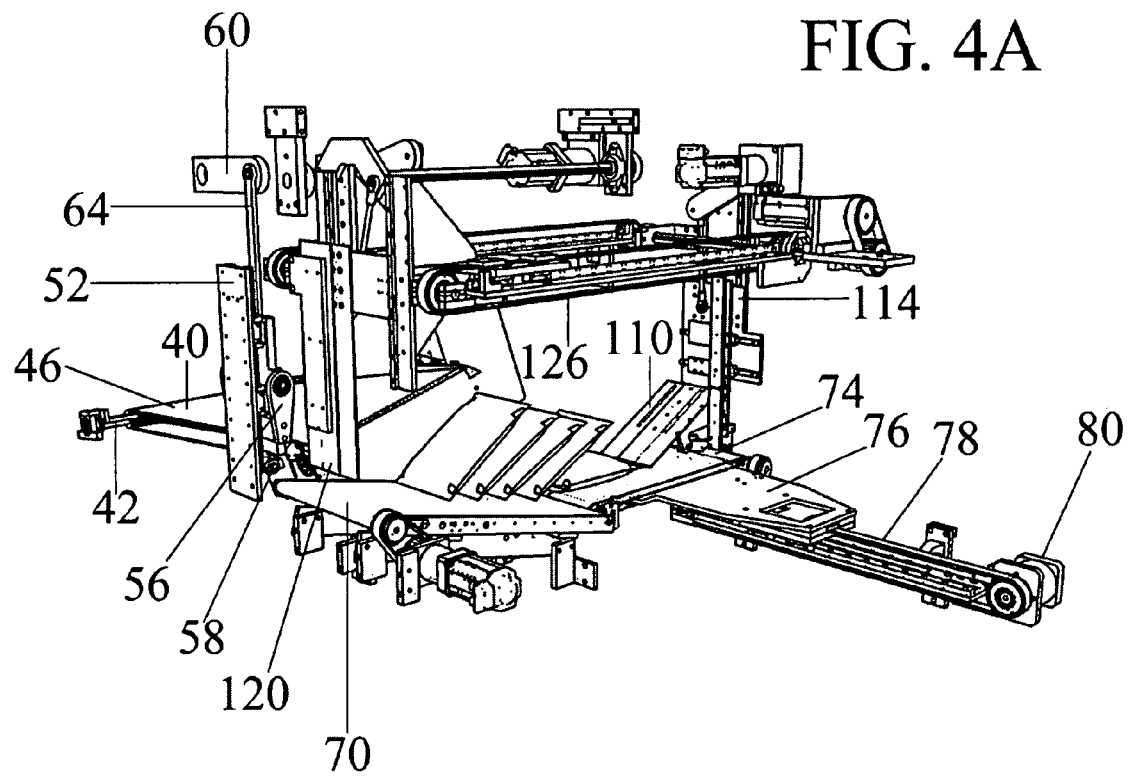
FIGS. 4A-4D show perspective views of the collating and orientation changing devices of the apparatus of FIG. 1.
Figure 4B:
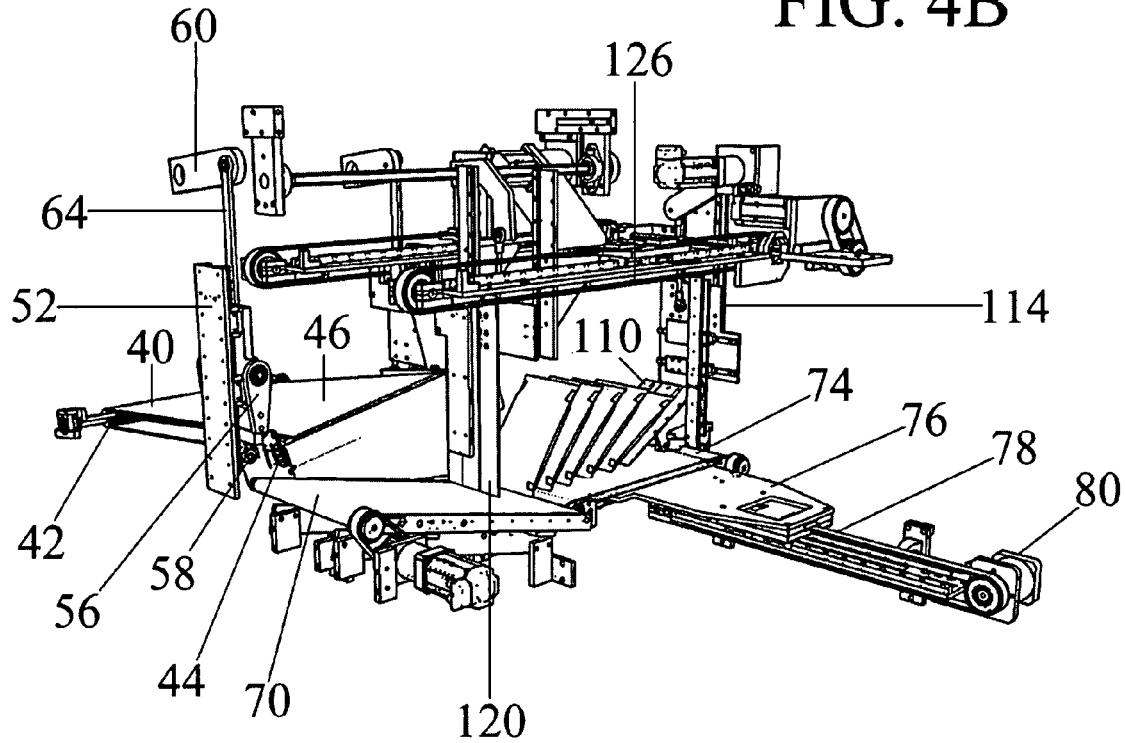
Figure 4C:
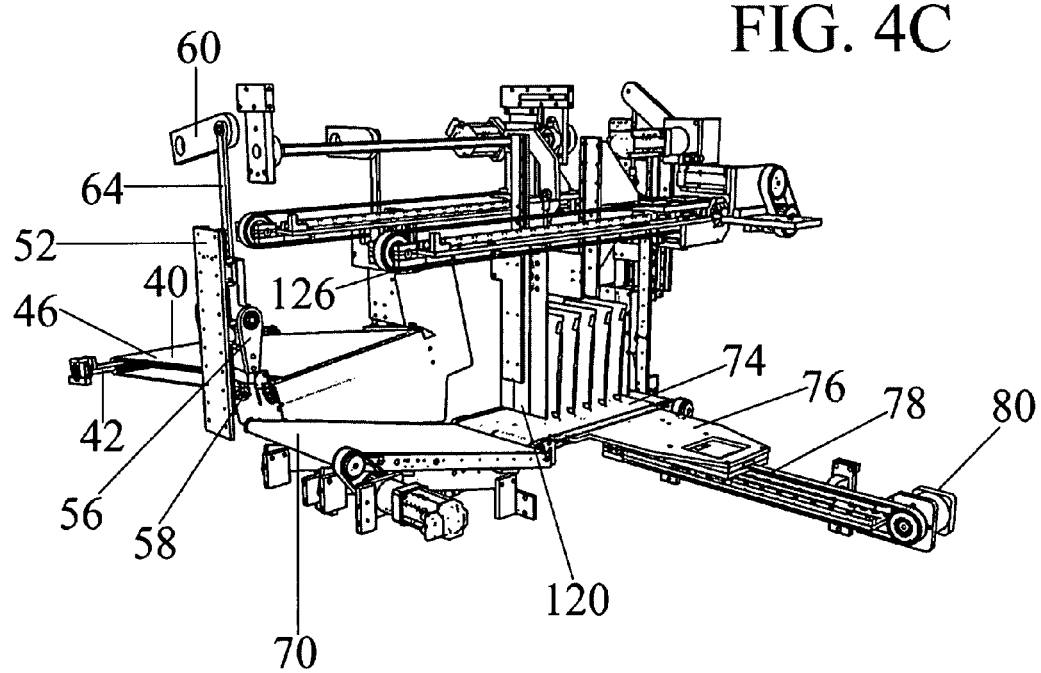
Figure 4D:
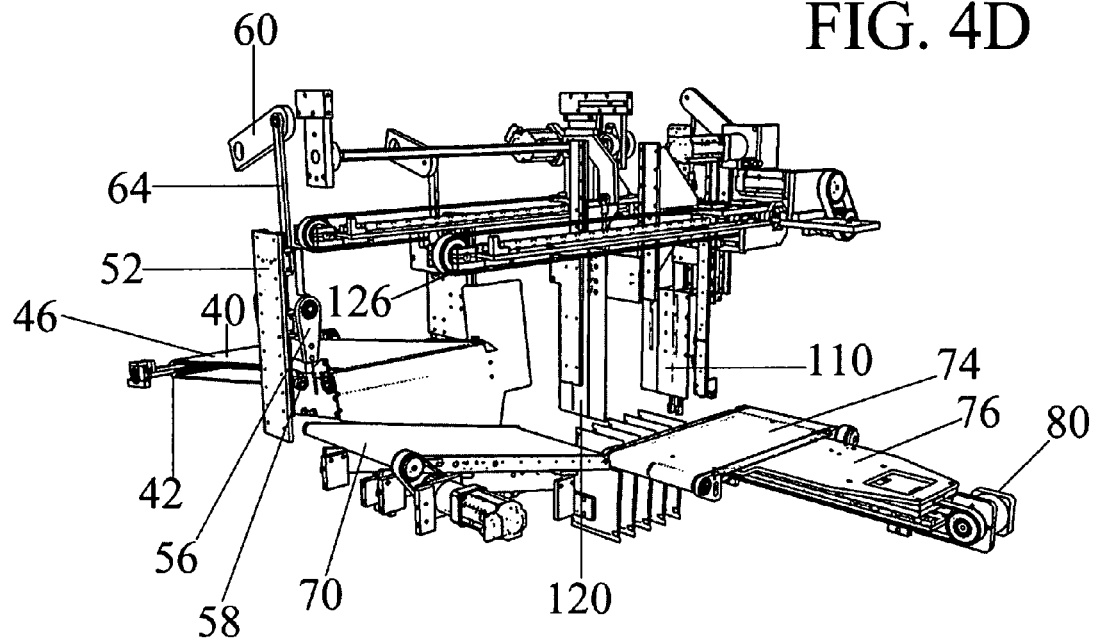
Figure 5:
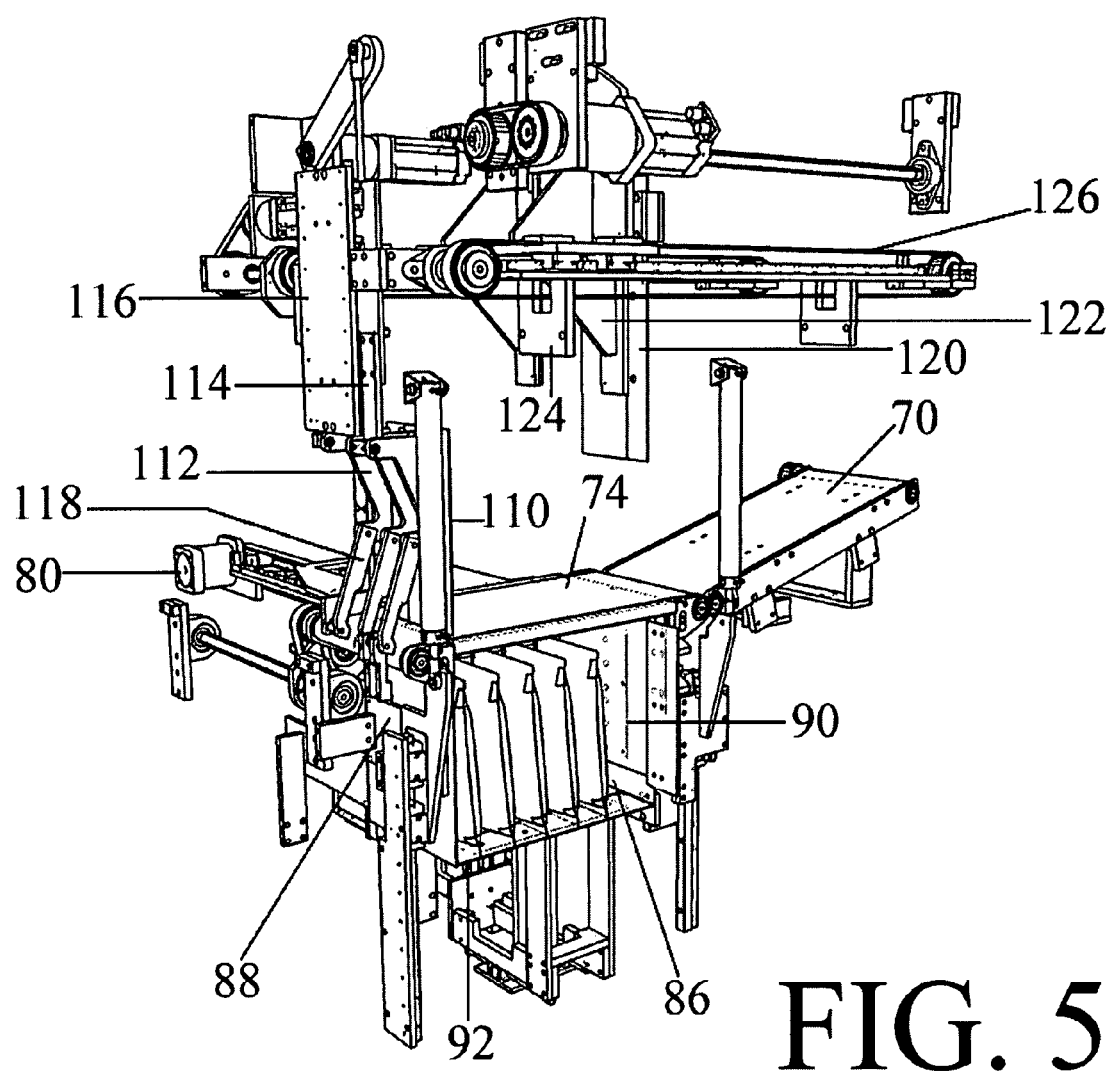
FIG. 5 shows a perspective view of the orientation changing device and accumulator of the apparatus of FIG. 1.
Figure 6:
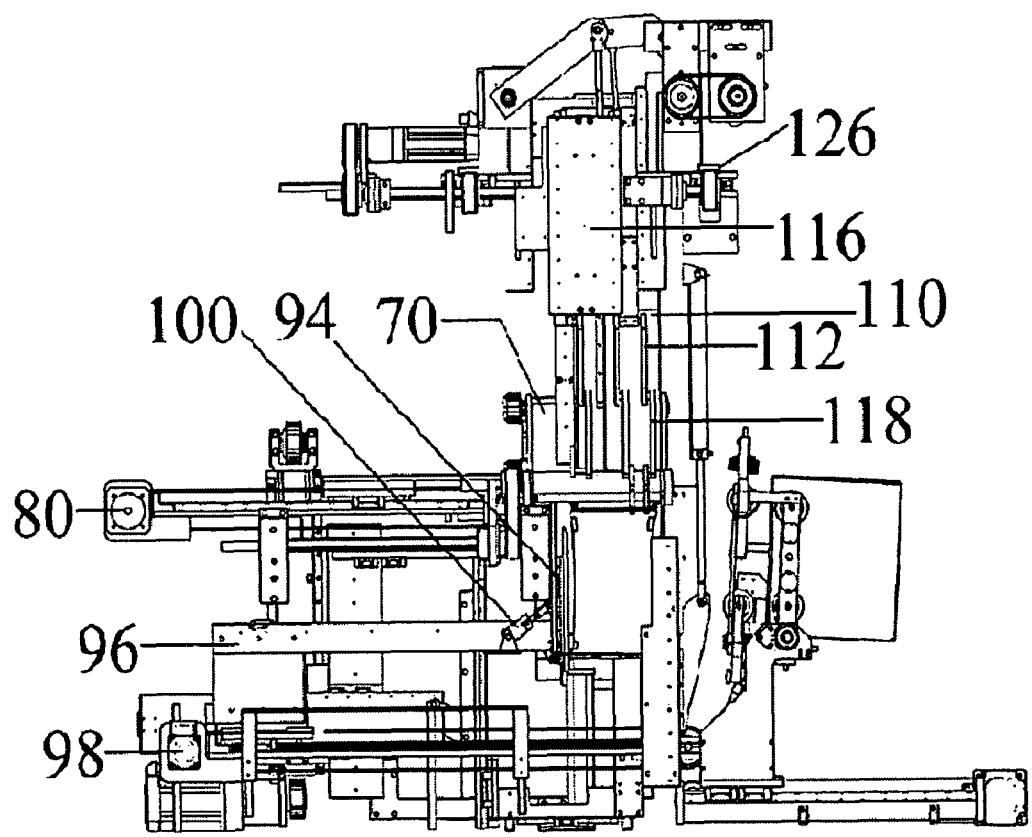
FIG. 6 shows an end view of the orientation changing device and accumulator of the apparatus of FIG. 1.
Figure 7:
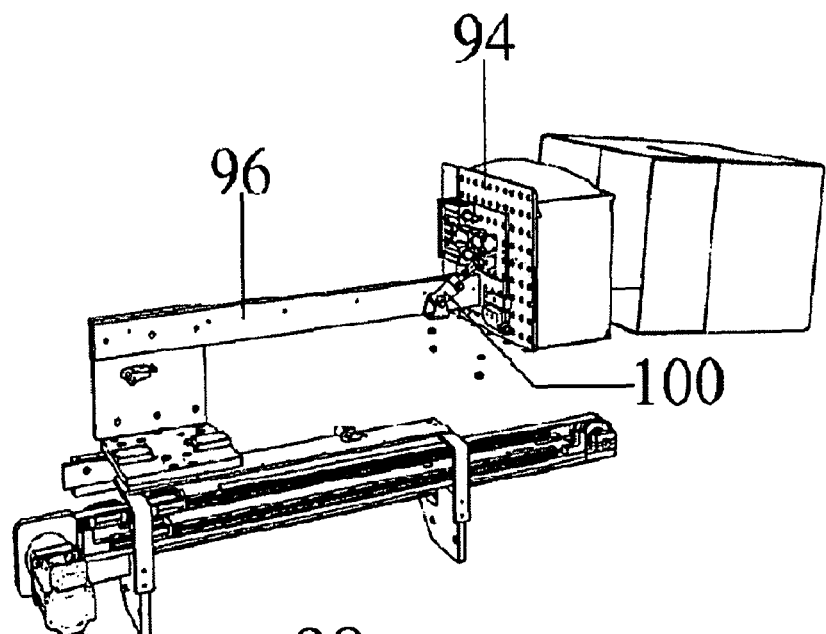
FIG. 7 shows a perspective view of the product pusher of the accumulator of the apparatus of FIG. 1.

All figures are drawn for ease of explanation of the basic teachings of the present invention only; the extensions of the Figures with the respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "side", "end", "inner", "outer", "inside", "outside", "upper", "lower", "front", "rear", "back", and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

An apparatus for loading product in the form of bags into a carton utilizing methods according to the preferred teachings of the present invention is shown in the drawings and generally designated 10. For the sake of example, bags being loaded are the type having a generally fin sealed tube (with or without gussets) with sealed ends commonly utilized for many food products including but not limited to potato chips, tortilla chips, cakes and other snack items. However, it should be appreciated that apparatus 10 and the methods of the present invention would have application to other types and forms of bags and/or other types of products than that shown and described for purposes of providing an illustrative embodiment.

Typically, during the production of product contained in bags, such bags will be outputted in an orientation. As an example, in the case of tube shaped, sealed end bags, typically, the bags will be outputted with one of the sealed ends leading the bag and the other end trailing the bag. Bags are often transported such as by conveyors in the orientation that they are outputted, which may not be the desired orientation when filling a carton. Thus, apparatus 10 includes an orientation adjustment device 16 receiving bags from the output conveyor 18. In particular, bags are received from output conveyor 18 onto an adjustment conveyor 20 which conveys the bags in a conveying direction at a greater speed than output conveyor 18 to insure that a minimum distance exists between the trailing and leading ends of the bags. A vertical guide 22 is provided along one edge of adjustment conveyor 20 parallel to the conveying direction. It is desired that the bags are conveyed on adjustment conveyor 20 such that they slide against or are closely adjacent to guide 22. In the most preferred form, a vertical belt device 24 is pivotably mounted about a vertical axis adjacent to the infeed end of adjustment conveyor 20 and angles towards guide 22. The free end of device 24 is spaced from guide 22 generally equal to the width of the bags. In the most preferred form, the angle of vertical belt device 24 as well as the length of the vertical belt device 24 along the conveying direction is adjustable to allow adjustment for various sizes of bags. If bags are received on adjustment conveyor 20 in a nonparallel manner and/or spaced from guide 22, such bags will engage and be pushed by vertical belt device 24 due to its angular relation to the conveying direction such that such bags are pushed laterally upon adjustment conveyor 20 to be parallel and closely adjacent to guide 22 and within an effective product conveying width of adjustment conveyor 20.

Orientation adjustment device 16 further includes a bumper 30 moveable between an abutting position and a noninterfering position such as but not limited to by an air cylinder. In the most preferred form, bumper 30 is within the path of the bags moving on adjustment conveyor 20 in the abutting position and is removed from the path of the bags moving on adjustment conveyor 20 in the noninterfering position. In the most preferred form shown, bumper 30 is moveable by being pivotable about a vertical axis perpendicular to the conveying direction and spaced downstream from guide 22. Particularly, bumper 30 is pivotable between the parallel, coextensive, noninterfering position relative to guide 22 and the bumping position extending at an acute angle to the conveying direction and guide 22 and with its upstream, leading end spaced inwardly from guide 22 an extent generally perpendicular to the conveying direction less than half and in preferred forms generally equal to one eight of the width of the leading ends of the bags being conveyed on adjustment conveyor 20. It should be appreciated that due to the abutment with bumper 30, the bags will turn 90° on adjustment conveyor 20 such that their widths are parallel to the conveying direction. After the bags are turned, bumper 30 is moved to its noninterfering position.

Orientation adjustment device 16 further includes a bag pusher 32 pivotally mounted to a mount 34 about a horizontal pivot axis spaced above adjustment conveyor 20 perpendicular to the conveying direction. Pusher 32 is pivotal between a home position parallel to and spaced above adjustment conveyor 20 and a pushing position perpendicular to adjustment conveyor 20 and the conveying direction. Pusher 32 is also moveable in the conveying direction while in the pushing position. Particularly, in the preferred form, mount 34 is movable between a downstream position and an upstream position along a path parallel to and spaced above adjustment conveyor 20 and the conveying direction. In the most preferred form shown, mount 34 is attached to a belt of a belt and pulley drive system 36. In the most preferred form, the bags are conveyed from adjustment conveyor 20 onto a twist conveyor 40, with the pusher 32 in the upstream position being above adjustment conveyor 20 and upstream of twist conveyor 40 and being above twist conveyor 40 and downstream of adjustment conveyor 20 in the downstream position. In the most preferred form, adjustment and twist conveyors 20 and 40 have equal conveying speeds, but pusher 32 moves slightly faster than adjustment conveyor 20 in the conveying direction. If a change in orientation is not desired, bumper 30 can remain in its noninterfering position and bag pusher can remain in its home position.

Twist conveyor 40 includes an upstream roller 42, a downstream roller 44 and a suitable continuous annular conveying surface 46 extending therebetween. Roller 42 is suitably rotatably mounted to the frame and in the preferred form is driven such as by a belt and pulley drive. Downstream roller 44 is rotatably mounted to first and second mounting plates 48.

Apparatus 10 according to the preferred teachings of the present invention includes a decline, collating conveyor 70 oriented transverse to twist conveyor 40 and the conveying direction of conveyors 20 and 40, with bags being conveyed from twist conveyor 40 onto decline conveyor 70. In the most preferred form, decline conveyor 70 slopes downwardly at a small acute angle and in the most preferred form at an angle of 15°. Decline conveyor 70 is intermittently driven such as by a servomotor.

Suitable provisions are provided to tilt downstream roller 44 at various angles relative to the horizontal. Specifically, in the preferred form shown, first and second track sets 52 are arranged vertically on opposite ends of roller 44. A carriage 54 is movably mounted on each track set 52. First and second legs of a clevis 56 are pivotably mounted to carriage 54 adjacent to the upstream end of decline conveyor 70 about a pivot axis generally parallel to the conveying direction. A head of clevis 56 is mounted to a corresponding one of mounting plates 48 by a universal joint 58 which allows pivotal movement in multiple dimensions. The other mounting plate 48 adjacent the downstream end of decline conveyor 70 is mounted by a universal joint 58 directly to the corresponding carriage 54. It should be appreciated that both mounting plates 48 could be mounted utilizing different types and forms of structures as shown and/or utilizing the same structure on both sides as long as downstream roller 44 maintains the same lateral relationship with guide 22 independent of the angle of downstream roller 44 relative to the horizontal. Carriages 54 are moved vertically on tracks sets 52 such as by crank arms 60 rotatable by first and second servomotors 62, with turnbuckles 64 pivotably connected to crank arms 60 and to carriages 54.

Apparatus 10 according to the preferred teachings of the present invention includes an orientation conveyor 74 downstream of and in the same conveying direction as decline conveyor 70. Orientation conveyor 74 is intermittently driven such as by a servomotor. In the preferred embodiment shown, orientation conveyor 74 is moveable between an aligned position with decline conveyor 70 and an offset position with decline conveyor 70. In the most preferred form, the offset position is in a direction perpendicular to the conveying direction of orientation conveyor 74. Orientation conveyor 74 can be suitably moveably mounted such as being mounted on a carriage 76 movably mounted on track set 78. Carriage 76 can be moved on track set 78 such as being attached to a belt of a belt and pulley drive 80 including a servomotor.

An accumulator 86 is provided under orientation conveyor 74 in its aligned position. In particular, accumulator 86 includes a fixed downstream vertical retainer plate 88, a movable upstream vertical retainer plate 90, and a horizontal lowerator 92. Retainer plate 90 is movable between a receiving position and a compressing position spaced closer to retainer plate 88. In the preferred form, retainer plate 90 is slideably mounted and moved between the receiving and compressing positions by an air cylinder.

The lowerator 92 is intermittently driven such as by a servomotor to differing vertical spacing from orientation conveyor 74. A sensor can be provided to check for the height of the bags positioned on lowerator 92.

One side of accumulator 86 intermediate retainer plates 88 and 90 is formed by a pusher plate 94. Pusher plate 94 is moveable in a pushing direction extending parallel to lowerator 92 and perpendicular to the movement direction of retainer plate 90 between a receiving position and a loaded position. In the preferred form shown, pusher plate 94 is pivotally mounted to the free end of a horizontal arm 96 which is mounted for horizontal movement such as by a belt and pulley drive 98. Suitable provisions such as an air cylinder 100 are provided to tilt pusher plate 94 relative to arm 96 and the horizontal.

Apparatus 10 includes suitable provisions for presenting the open end of a carton adjacent to accumulator 86 opposite to pusher plate 94. It should be appreciated that the carton can be of a variety of types and/or forms including the opposite end closed such as by but not limited to being fan folded or folded and taped. In the most preferred form, the carton is tilted from the horizontal at a small acute angle in the order of 6°. Also, a suitable device for funneling accumulated bags in accumulator 86 into the carton can be provided. It should be appreciated that such provisions can be of a variety of forms and types according to the teachings of the present invention.

Apparatus 10 according to the preferred teachings of the present invention further includes a product scoop 110 moveable between an extended, inclined position and a retracted vertical position relative to orientation conveyor 74. In particular, in the retracted vertical position, scoop 110 extends generally perpendicular to the downstream end of orientation conveyor 74 and generally aligned with and coextensive to retainer plate 88. In the extended, inclined position, product scoop 110 extends at an acute angle in the order of 45° to orientation conveyor 74 and has an extent upstream of the downstream end of orientation conveyor 74.

Suitable provisions are provided for moving product scoop 110 between its inclined and retracted positions. In the form shown, product scoop 110 is mounted to a C-shaped frame 112 having its upper ends pivotally attached to a carriage 114 slideably mounted on vertical track 116. The lower ends of frame 112 are pivotally attached to the upper end of a lever 118 having its lower end pivotally mounted to the frame. As the pivot axes of frame 112 and lever 118 are in a spaced parallel relation, movement of carriage 114 such as under control of a servomotor upon vertical track 116 results in movement of product scoop 110 according to the preferred teachings of the present invention.

Apparatus 10 according to the preferred teachings of the present invention further includes a product pusher 120 movable between a home position at the upstream end of decline conveyor 70 and a pushing position at the upstream end of orientation conveyor 74 and parallel to the conveying direction of conveyors 70 and 74. Furthermore, product pusher 120 is simultaneously movable in a vertical direction such that its lower end generally follows and is closely adjacent to decline conveyor 70 as it moves from the home position to the pushing position. Suitable provisions are provided for moving the product pusher 120 such as being mounted to a carriage 122 slideably mounted to a track 124 for movement in the vertical direction, and with track 124 being moveable in a horizontal direction such as along a linear bearing 126.

Now that the basic construction of apparatus 10 according to the preferred teachings of the present invention have been set forth, a preferred method of operation can be explained. For purposes of explanation, it will be assumed that bags are being received in twist conveyor 40 in a serial manner from adjustment conveyor 20 in the desired orientation (either in the orientation which they were outputted or as oriented by orientation adjustment device 16). Further, it will be assumed that there are no bags located on conveyers 70 and 74, and that twist conveyor 40 is positioned with the end of roller 42 closest to orientation conveyor 74 to be at the same level as and preferably lower than the opposite end of roller 42, with roller 42 declining 15° from a horizontal in the same direction as decline conveyor 70. The bag will be conveyed upon twist conveyor 40 in the conveying direction onto decline conveyor 70. Thereafter, twist conveyor 40 is positioned with the end of roller 42 closest to orientation conveyor 74 to be above the level of opposite end of roller 42 and in the preferred form with roller 42 declining 15° in the opposite direction as decline conveyor 70. After the bag is placed thereon, decline conveyor 70 is actuated to move the bag a distance which is a fraction of the length of the bag and in the preferred form in the order of one eighth the length of the bag. The next bag will be conveyed by twist conveyor 40 onto declined conveyor 70 partially on the previous bag located on decline conveyor 70 and partially on decline conveyor 70.

It should be appreciated that the angle of downstream roller 42 is adjustable within a plane parallel to the conveying direction of decline conveyor 70. The reason that the end of roller 42 is initially lower is to reduce the drop of the first bag from twist conveyor 40 onto decline conveyor 70 to minimize gravitational forces on the bag which could damage the contents thereof. The reason for the end of roller 42 being elevated is to insure that succeeding bags partially overlap previous bags on decline conveyor 70. In the most preferred form, the first bag drops onto decline conveyor 70 for a spacing generally equal to the distance that succeeding bags drop onto decline conveyor 70 and previous bags.

This procedure is continued until the desired number of bags are located on orientation conveyor 74 and/or decline conveyor 70. At that time, product pusher 120 located in its home position is lowered so that its free end is adjacent to decline conveyor 70. At that time, product pusher 120 is moved towards its pushing position (while simultaneously being vertically lowered to maintain the spacing with decline conveyor 70) to push the overlapped bags, with conveyors 70 and 74 also moving at the same rate of speed as product pusher 120. The first bag contacts and partially slides up the free end of product scoop 110 located in its inclined position. After such contact, product scoop 110 is moved from its inclined position towards its retracted position at the conveying speed of conveyors 70 and 74 and product pusher 120 such that the free end or nose of product scoop 110 moves in the conveying direction. Thus, the bags are moved from being partially overlapped in a collated condition to a vertical orientation sandwiched between product scoop 110 in its retracted, vertical position and the product pusher 120 in its lowered, pushing position.

When the bags are in their vertical orientation, conveying by conveyor 74 and pushing by product pusher 120 is stopped. At that time, orientation conveyor 74 can be moved from its aligned position to its offset position and product pusher 120 can be retracted slightly to allow bags in the vertical condition to move into accumulator 86. After the bags move into accumulator 86, lowerator 92 can be lowered a distance depending upon bag size, with the sensor checking to insure all bags are below the lower surface of orientation conveyor 74. After sensing has been completed, orientation conveyor 74 is moved from its offset position to its aligned position to be ready to receive the next cycle of bags. After orientation conveyor 74 is in its aligned position, retainer plate 90 is moved to a compressing position, and lowerator 92 can be moved up to compress or sandwich the bags against the lower surface of orientation conveyor 74 (which preferably is in the form of a plate) to define a relatively consistent surface for next rows of bags to be placed thereon. After compressing, lowerator 92 can be lowered slightly such that the bags in accumulator 86 do not interfere with movement of orientation conveyor 74 in the next cycle.

It should be appreciated that the next cycle of products could be another row of bags in a vertical condition or could be row of one or more bags in a horizontal condition. In this regard, product scoop 110 can be maintained in its retracted vertical position and simply acts as a stop if bags are not desired to be orientated in a vertical condition. Furthermore, it is possible to load only a single row of product in accumulator 86 according to the volume of the carton desired to be loaded.

After the desired number of bags are in accumulator 86, pusher plate 94 is actuated to push the bags in accumulator 86 into the carton. As the bags contact the bottom of the case, pusher plate 94 is pivoted relative to arm 96 to match the angle of the carton, with the tilting of pusher plate 96 and the tilting of the carton allowing the bags to be firmly positioned in the carton and prevent the bags from falling out. In this regard, this is especially important if additional layers of bags are subsequently filled from accumulator 86 in further cycles of operation.

Now that the basics teachings of the present invention have been explained, many extensions and variations will be obvious to one having ordinary skill in the art. For example, although apparatus 10 of the most preferred form includes the combination of several, unique features believed to obtain synergistic results, apparatus for handling products could be constructed according to the teachings of the present invention including such features singly or in other combinations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Method for collating product comprising:
   conveying a first product on a continuous conveying surface in a first conveying direction onto a collating conveyor, with the product having a length perpendicular to the first conveying direction, with the continuous conveying surface being spaced a spacing from the collating conveyor when the first product drops onto the collating conveyor;
   moving the first product on the collating conveyor in a second conveying direction perpendicular to the first conveying direction for a distance less than the length of the product; and
   conveying a second product on a continuous conveying surface in the first conveying direction partially onto the first product and partially on the collating conveyor, with the continuous conveying surface being spaced from the collating conveyor when the second product drops onto the first product for a distance greater than the spacing, with conveying the second product comprising conveying the second product to drop on the first product for a height generally equal to the spacing.

2. The method of claim 1 with conveying the second product comprises tilting the continuous conveying surface relative to the collating conveyor.

3. The method of claim 2 with conveying the first product comprising placing the product upon a twist conveyor having a continuous conveying surface extending between an upstream roller and a downstream roller, with the first product passing beyond the downstream roller when dropping onto the collecting conveyor, with conveying the second product comprising tilting the downstream roller to the horizontal to adjust the spacing to the collating conveyor.

4. The method of claim 2 with moving the first product comprising moving the first product down an incline to horizontal on the collating conveyor.

5. The method of claim 4 with conveying the first product comprising placing the product upon a twist conveyor having the continuous conveying surface extending between an upstream roller and a downstream roller, with the first product passing beyond the downstream roller when dropping onto the collecting conveyor, with conveying the second product comprising tilting the downstream roller to the horizontal to adjust spacing to the collating conveyor.

6. Product collating device comprising, in combination: a twist conveyor conveying product in a first conveying direction; an intermittently operated collating conveyor conveying product in a second conveying direction perpendicular to the first conveying direction, with the collating conveyor receiving product from the twist conveyor, with the twist conveyor including a downstream roller with the product passing beyond the downstream roller onto the collating conveyor, with the downstream roller being in a plane parallel to the second conveying direction, with an angle of the downstream roller being adjustable within the plane parallel to the second conveying direction.

7. The product collating device of claim 6 with the intermittently operated collating conveyor conveying product down an incline to horizontal.

8. Method for collating product comprising:
   conveying a first product upon a twist conveyor in a first conveying direction onto a collating conveyor, with the product having a length perpendicular to the first conveying direction, with the twist conveyor having a continuous conveying surface extending between an upstream roller and a downstream roller, with the first product passing beyond the downstream roller when dropping onto the collecting conveyor;
   moving the first product on the collating conveyor in a second conveying direction perpendicular to the first conveying direction for a distance less than the length of the product; and
   conveying a second product upon the twist conveyor in the first conveying direction partially onto the first product and partially on the collating conveyor, with conveying the second product comprising tilting the downstream roller to the horizontal to adjust a spacing to the collating conveyor.

9. The method of claim 8 with moving the first product comprising moving the first product down an incline to horizontal on the collating conveyor.

* * * * *